(12) United States Patent
Pirzada et al.

(10) Patent No.: US 7,474,615 B2
(45) Date of Patent: Jan. 6, 2009

(54) NETWORK OPTIMIZATION BASED ON TRAFFIC PRIORITIZATION

(75) Inventors: Fahd B. Pirzada, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 604 days.

(21) Appl. No.: 11/178,895

(22) Filed: Jul. 11, 2005

(65) Prior Publication Data

US 2007/0008978 A1  Jan. 11, 2007

(51) Int. Cl.
*H04L 1/00* (2006.01)

(52) U.S. Cl. ..................... 370/230; 370/235
(58) Field of Classification Search ............... None
See application file for complete search history.

(56) References Cited

U.S. PATENT DOCUMENTS

| | | | |
|---|---|---|---|
| 5,933,420 A | 8/1999 | Jaszewski et al. | |
| 5,943,332 A | 8/1999 | Liu et al. | |
| 6,208,629 B1 | 3/2001 | Jaszewski et al. | |
| 6,526,281 B1 | 2/2003 | Gorsuch et al. | |
| 6,694,141 B1 | 2/2004 | Pulkkinen et al. | |
| 6,697,013 B2 | 2/2004 | McFarland et al. | |
| 6,741,559 B1 | 5/2004 | Smeulders et al. | |
| 6,834,045 B1 | 12/2004 | Lappetelainen et al. | |
| 7,142,852 B2 * | 11/2006 | Tell et al. | 455/426.2 |
| 7,190,974 B2 * | 3/2007 | Efland et al. | 455/562.1 |
| 7,333,800 B1 * | 2/2008 | Gopinath | 455/411 |
| 2002/0181418 A1 | 12/2002 | Awater et al. | |
| 2002/0188723 A1 | 12/2002 | Choi et al. | |
| 2004/0100923 A1 * | 5/2004 | Yam | 370/328 |

FOREIGN PATENT DOCUMENTS

GB  GB2308789 A  7/1997
WO  WO2004/105320 A1  12/2004

OTHER PUBLICATIONS

IEEE 802.1p:LAN Layer 2 Qos/CoS Protocol For Traffic Prioritization; http://www.javvin.com/protocol8021p.html; printed from Internet on Feb. 17, 2005, 2 pgs.
See, "802.1 1h Helps WLANs Share Spectrum", NetworkWorldFusion, http://www.nwfusion.com/news/tech/2004/071904techupdate.html, printed from Internet Apr. 13, 2005, 7 pgs.
Cox, "Keep Track Of The 802.11 Alphabet Soup", TechWorld, http://www.techworld.com/mobility/features/index.cfm?FeatureID=1065, printed from Internet Feb. 20, 2005, 5 pgs.
Copending U.S. Appl. No. 11/124,587, entitled "Systems And Methods For RF Spectrum Management", filed May 6, 2005, 29 pgs.
Copending U.S. Appl. No. 11/037,315, entitled "Method For Sharing Spectrum For Voice Over Internal Protocol Application", filed Jan. 18, 2005, 18 pgs.
Copending U.S. Appl. No. 10/761,783, entitled "System And Method For Dynamic Switching Between Wireless Network Protocols", filed Jan. 21, 2004, 34 pgs.
IEEE 802.IP; The Technologies Behind The Network; Metro Access Networks; http://www.xilinx.com/esp/networks_telecom/optical/net_tech/ieee8; printed from Internet on Feb. 17, 2005; 2 pgs.

* cited by examiner

*Primary Examiner*—Frank Duong
(74) *Attorney, Agent, or Firm*—O'Keefe, Egan Peterman & Enders LLP

(57) ABSTRACT

Systems and methods for providing a deterministic process for implementing network traffic prioritization, particularly for implementing bandwidth latency sensitive applications are described herein. In one embodiment, multiple network interfaces are provided within a system. Network communication traffic through the system may be prioritized between different network interfaces based upon the type of traffic that is being handled. Higher priority bandwidth or latency sensitive traffic maybe routed to the network interface that best suited for such traffic. In some applications each network interface may operate in a separate band, however, in other applications one or more of the network interfaces may be of the same band type.

20 Claims, 2 Drawing Sheets

| TRAFFIC TYPE | 802.1p PRIORITY | |
|---|---|---|
| | | |
| BEST EFFORT | 0 | |
| BACKGROUND | 1 | |
| UNDEFINED | 2 | 802.11b/g |
| EXPECTED EFFORT | 3 | |
| CONTROLLED LOAD | 4 | |
| VIDEO | 5 | |
| VOICE | 6 | 802.11a |
| NETWORK MANAGEMETNT | 7 | |
| | | |

NETWORK OPTIMIZATION BASED ON TRAFFIC PRIORITIZATION

TECHNICAL FIELD OF THE INVENTION

This invention relates to network communications and, more particularly, to prioritizing network traffic based upon the traffic content.

BACKGROUND

Many network standards provide little inherent control for traffic quality of service (QoS), class of service (CoS) or prioritization. Such environments often create a non-deterministic usage of the network. Such non-deterministic networks are particularly problematic when attempting to delivery latency sensitive traffic such as, for example, real-time voice and multimedia content.

A variety of IEEE 802.11 wireless standards are well known in the art and many of these may provide a user experience that is not sufficiently deterministic. For example, the 802.11a/b/g Wireless LAN (WLANs) standards are utilized across a wide range of devices. These 802.11 wireless networks utilize a protocol that is inherently non-deterministic. As such, the performance of 802.11 networks for latency sensitive applications such as voice over IP (VoIP) or streaming multimedia may be less than desirable. Other wireless network standards that are expected to be widely used in the future including 802.11n, 802.15, 802.16 and others. Some of these standards may similarly lack the desired determinism that latency sensitive applications may require.

Standards do exist to prioritize network traffic based on content. For example, the IEEE 802.1p standard provides a prioritization specification that operates at the media access control (MAC) framing layer (OSI model layer 2). In this standard, the header includes a three-bit field that allows for providing 8 different levels of priority to assign to packets. Network adapters and switches may then route traffic based upon the prioritization levels. The IEEE has made broad recommendations for the 8 different priority levels based on traffic type ranging from network critical traffic down to loss eligible traffic (in order of highest priority): network management, voice, video, controlled load, expected effort, undefined, background, and best effort. In the 802.1p standard, traffic is simply classified and no bandwidth reservations are assigned. The 802.1p standard is an extension of the 802.1Q standard that specifies a VLAN tag that is appended to a MAC frame. The 802.1p standard utilizes a prioritization field (3 bits) that was not defined and used in the 801.1Q standard.

It is desirable to provide improvements in the methods and techniques for providing a more deterministic process for implementing network traffic prioritization, particularly for implementing latency sensitive applications.

The devices that may benefit from improved network traffic prioritization are wide ranging. For example, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

Systems and methods for providing a deterministic process for implementing network traffic prioritization, particularly for implementing bandwidth or latency sensitive applications are described herein. In one embodiment, multiple network interfaces are provided within a system. Network communication traffic through the system may be prioritized between different network interfaces based upon the type of traffic that is being handled. Higher priority bandwidth or latency sensitive traffic may be routed to the network interface that is best suited for such traffic. In some applications each network interface may operate in a separate frequency band, however, in other applications one or more of the network interfaces may be of the same frequency band(s) type.

In another embodiment, a method is provided for routing network communication traffic. The method may comprise providing an information handling system that is configured to process a plurality of types of network communication traffic. The method may also comprise providing a plurality of network interfaces and selectively routing the network communication traffic between the plurality of network interfaces. The selective routing may be accomplished by prioritizing the network communication traffic based upon the type of the network communication traffic.

In yet another embodiment, a method of routing wireless network traffic is disclosed. The method may comprise providing a system that transmits or receives network traffic from a plurality of types of applications and providing a plurality of wireless network interfaces. The method may further comprise prioritizing the network traffic from different ones of the types of applications selectively between the plurality of wireless network interfaces based upon at least the type of the application.

In still another embodiment, an information handling system configured to communicate network traffic is disclosed. The system may include one or more network traffic sources, wherein a plurality of application types of network traffic are provided by the one or more network traffic sources. The system may further include a plurality of network interfaces for communicating network traffic to a plurality of networks. The system may further include a device driver layer coupled to the network traffic sources to receive the plurality of application types of network traffic and coupled to the plurality of network interfaces. The device driver layer may prioritize network traffic based upon the application type of the network traffic selectively between different ones of the plurality of network interfaces.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

A more deterministic process for implementing network traffic prioritization, particularly for implementing bandwidth or latency sensitive applications is described herein. In one embodiment, multiple network interfaces are provided within a system. Network communication traffic through the system may be prioritized between different network interfaces based upon the type of traffic that is being handled. In some applications each network interface may operate in a separate frequency band or portion of the frequency spectrum, however, in other applications one or more of the network interfaces may operate in the same frequency spectrum or within the same band type.

It will be recognized that the structures, techniques and methods described herein may be utilized in conjunction with a wide variety of systems and devices, including for example information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
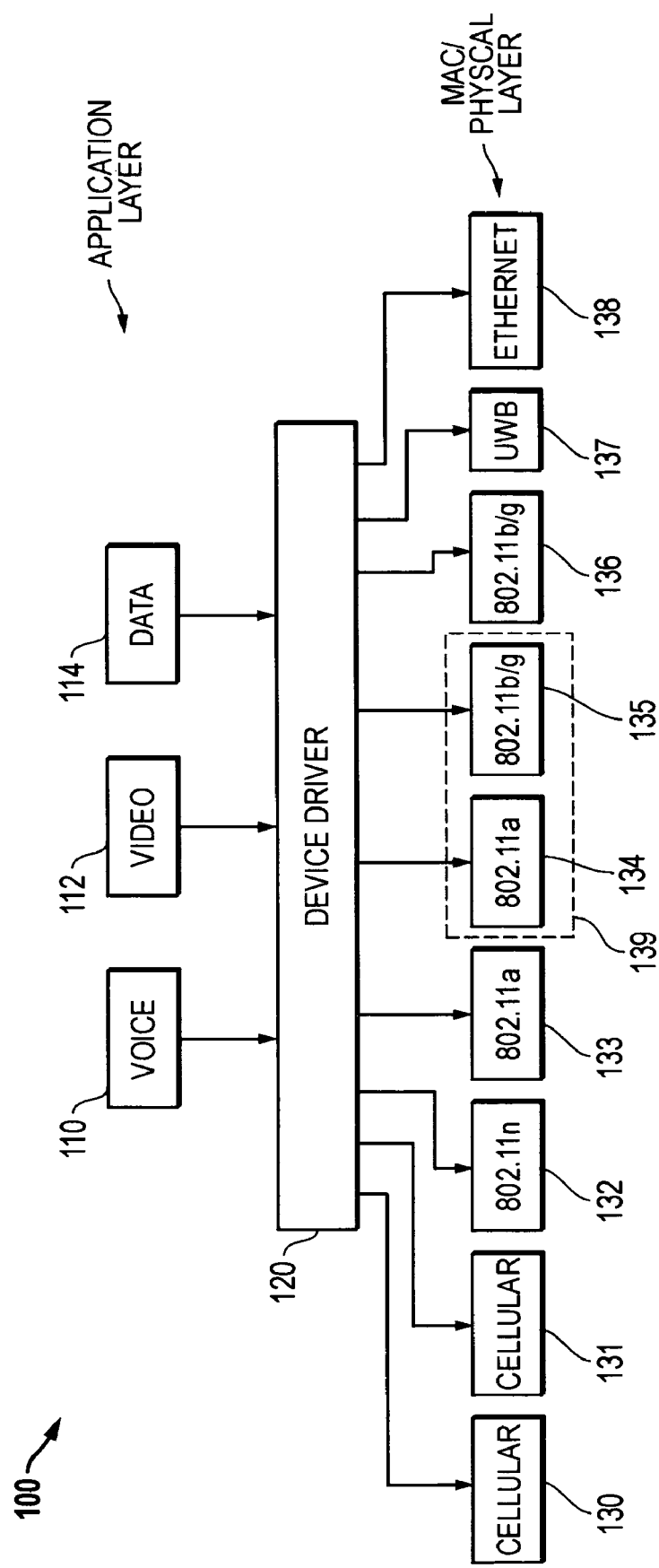
FIG. 1 illustrates an exemplary system that may utilize the prioritization techniques described herein.

FIG. 1 illustrates an exemplary information handling system 100 that may utilize the prioritization techniques described herein. As shown in FIG. 1, the information handling system may include a variety of information traffic sources at the application layer. For example, a voice application 110, a video application 112, and a data application 114 are shown. It will be recognized that other applications may be utilized and that the applications shown herein are merely illustrative as the techniques discussed herein may be utilized with any environment where it is desirable to provide priority levels between multiple applications.

The applications 110, 112, and 114 may be coupled to a device driver layer 120. The device driver layer 120 may in turn be coupled to a wide variety of network interfaces at the MAC/Physical layer. For example, as shown in FIG. 1, the device driver layer 120 may be coupled to network interfaces 130-138. As shown in FIG. 1, the network interfaces 130-138 may conform to any of a wide variety of communication protocols and the examples given are meant to only be illustrative. For example, network interfaces 130 and 131 may be cellular interfaces such as cellular phone circuitry for communication between the information handling system and a cellular base station. Network interfaces 132-136 may be 802.11 compliant network interfaces that are compliant with various 802.11 WLAN (wireless local area network) protocols. These 802.11 network interfaces may be, for example, formed at a wireless access point or alternatively may be formed at a wireless client station (such as for example the hardware and software of a WLAN card. Network interface 132 may be compliant with the 802.11n protocol. As examples, network interfaces 133 and 134 may be compliant with the 802.11a protocol. Network interfaces 135 and 136 may be compliant with the 802.11b and/or 802.11g wireless protocols. Network interface 137 may be compliant with any of a variety of ultra-wideband protocols (UWB). Network interface 138 may be compliant with the Ethernet protocol, thus illustrating that a network interface need not be a wireless network interface.

The network interfaces 130-138 may be formed as separate devices or may be configured together as multimode devices. For example, a multimode device 139 may be formed as a device that includes multiple network interfaces: one interface operating in compliance with the 802.11a protocol and one interface operating in compliance with the 802.11b/g protocols. Other multimode devices may be formed by other combinations of multiple network interfaces and the combination in multimode device 139 is merely illustrative. As shown in FIG. 1, the network interfaces of the information handling system may include multiple network interfaces that are compliant with the same protocol. For example network interfaces 130 and 131 are both cellular network interfaces, networks interfaces 133 and 134 are both 802.11a wireless network interfaces, etc. It will be recognized that the techniques disclosed herein may be used in conjunction with systems that have multiple similar network interfaces or with systems that have each network interface being compliant with a different communication protocol. Moreover as will be understood with the benefits of this disclosure, the number of network interfaces shown in the exemplary information handling system 100 may also be varied and it is anticipated that a user's preferred embodiment may have a different number and variety of network interfaces then as shown in FIG. 1. In one embodiment, the information handling system may include two network interfaces, one being an 802.11a interface and one being an 802.11b/g interface. As protocols and standards change it is anticipated that the techniques described herein may be utilized with a wide variety of communication protocols, some which may not even be established at this time.

In operation, the information handling system 100 of FIG. 1 may operate to prioritize communication traffic based upon the content and/or type of communication traffic being communicated. For example, latency sensitive communication traffic may receive a higher priority than relatively latency insensitive communication traffic. Network communication traffic having a higher priority may then be assigned by the device driver layer 120 to a network interface of a protocol type that has a higher transmission rate. Thus, higher priority of traffic may be assigned to the network interface that is more capability of meeting the needs of that communication traffic. For example in an example embodiment having an 802.11a network interface and an 802.11b network interface, higher priority traffic may be assigned to the 802.11a network interface for which the protocol may operate at up to 54 Mbps and lower priority traffic may be assigned to the 802.11b network interface for which the protocol may operate at transmission rates of up to 11 Mbps.

The selection of which network interface to direct higher priority network communication traffic may be dependent upon more than the theoretical transmission rates and capacity of each network interface. For example, statistics on the quality of and transmission rates of the transmission on a particular network interface may be monitored and also used as the basis of the selection where to direct higher priority communication traffic. In certain cases, due to distance between wireless points, interference from other sources, other environmental conditions, etc. a network interface that normally has superior transmission characteristics may in actually use have transmission characteristics that are less desirable than another network interface. Using the 802.11a and 802.11b example described above, there may be circumstances in which the 802.11b network interface provides superior transmission characteristics. In that case, higher priority traffic may be directed to the 802.11b network interface and lower priority traffic may be directed to the 802.11a network interface.

The determination as to which communication traffic receives a higher priority may vary widely depending upon the overall system application and a user's desired priority schemes. The example of FIG. 1 illustrates three types of communication traffic: voice, video and data. In an exemplary prioritization scheme, the voice traffic (which may be, for example, VoIP) may have the highest priority, then video traffic and then data traffic. It will be recognized that other priority schemes may be used. For example, only two priority levels may be selected such as high priority and low priority. The various types of traffic may then be assigned the desired priority level.

Figures 2, 3:
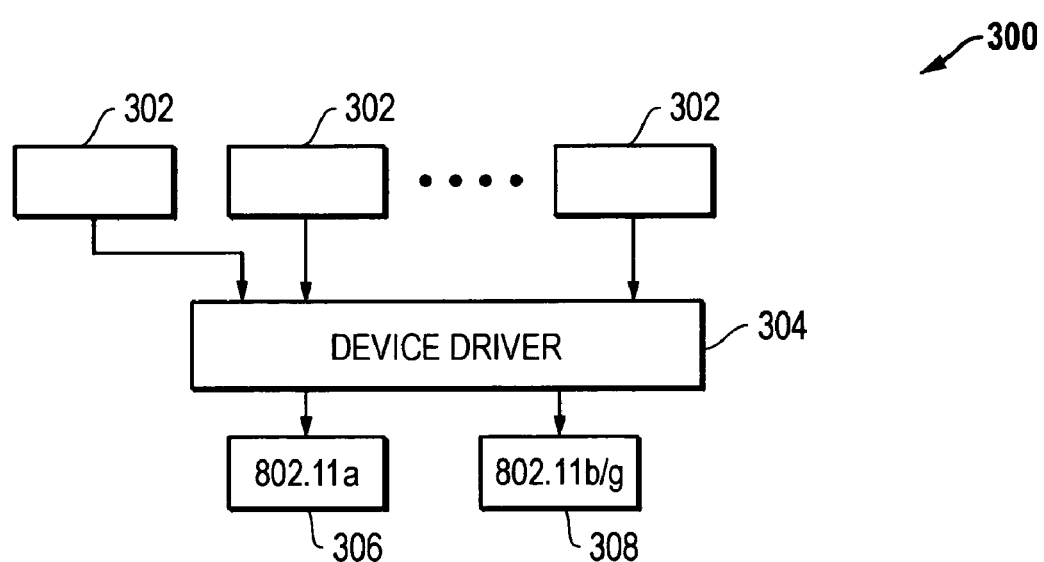
FIG. 2 is an exemplary prioritization table that may be utilized in one embodiment of the techniques described herein.
FIG. 3 illustrates an exemplary system that may utilize the prioritization techniques described herein in conjunction with two network interfaces.

One prioritization scheme that may be utilized with the techniques of the present invention is the 802.1p specification. The 802.1p specification allows for eight different levels of prioritization that are set by adding priority tags to a MAC frame. The priority level that is assigned to a particular type of traffic may then determine which network interface is utilized to communicate the traffic. For example, FIG. 2 illustrates an exemplary application of the techniques described herein utilizing 802.1p prioritization designations for prioritizing traffic in a system that has two network interfaces, one 802.11a network interface and one 802.11b/g network interface. As shown in FIG. 2, each traffic type 200 is assigned an 802.1p priority level 202. As shown, the highest priority level (level 7) is assigned to network management traffic. Voice, video, controlled load, expected effort, undefined, background, and best effort traffic types are similarly assigned priority levels 6, 5, 4, 3, 2, 1, and 0 respectively. Traffic in priority levels 7, 6 and 5 may be assigned to one network interface (the 802.11a network interface as indicated) and traffic in priority levels 4-0 may be assigned to the other network interface (the 802.11b/g network interface as indicated). As network management, voice and video traffic may be the most latency sensitive traffic, the priority levels associated with these types of traffic are assigned to the 802.11a network interface (the network interface initially assumed to have the best performance for such traffic). By assigning lower priority traffic to the 802.11b/g network interface, the 802.11a network interface may be maintained as less congested, thus maximizing it's potentially capability for handling more bandwidth or latency sensitive traffic.

FIG. 3 illustrates an information handling system 300 that may use the prioritization scheme of FIG. 2 in a system having two network interfaces. As shown in FIG. 3, any number of different types of communication traffic 302 may be provided to the device driver layer 304. The device driver layer 304 may assign one of the eight 802.1p priority levels to the traffic depending upon the traffic type. The device driver layer 304 may then direct the communication traffic to the appropriate network interface, either network interface 306 (an 802.11a network interface) or network interface 308 (an 802.11b/g). Utilizing the prioritization scheme of FIG. 2, traffic having priority levels 7, 6 and 5 would be routed to network interface 306 and traffic having priority levels 4, 3, 2, 1, and 0 would be routed to network interface 308. Though shown as two separate network interfaces 306 and 308, it will be recognized that as mentioned above the network interfaces may operate from a single multi-mode device such as a multi-mode WLAN device that support both 802.11a and 802.11b/g operations.

As will be recognized, the techniques described with reference to the system 300 of FIG. 3 may be applied to any different number and types of traffic. Further, the prioritization scheme is not limited to the prioritization scheme of FIG. 2. Finally, the techniques may be applied to any different number and types of network interfaces. For example, an alternative system may be comprised of an UWB network interface and an 802.11n network interface. One prioritization technique may route video traffic for a particular video display to the UWB network interface while all other traffic is routed to the 802.11n interface. Yet another prioritization technique for such an alternative system may route all VoIP voice calls to the UWB network interface and all other traffic to the 802.11n interface. Thus, it will be recognized that the techniques described herein may be combined in a wide range of manners and the invention described herein is not limited to the particular examples shown.

The techniques described herein are not limited to a particular side of a network connection. For example, the information handling systems of FIG. 1 or FIG. 3 may be implemented in client side devices such as wireless client stations or may be implemented enterprise devices such as wireless routers or wireless access points.

As mentioned above, the linking of a priority level to a particular network interface may be permanently set or static, or alternatively, may be dynamically adjusted. Thus, priority levels may be statically set to a particular network interface based upon the assumed properties of the network interface (properties such as assumed transmission rates and reliability). Alternatively, dynamic assignment of the priority levels to a particular network interface may be utilized. The dynamic assignment process may involve evaluating which network interface provides the best available network performance at a given time. Higher priority traffic may than be associated with the higher performing network interface. The network performance of any particular network interface may be evaluated using any of wide variety of techniques, including for example, the 802.11k standard that enables clients and access points to gather layer 1 and 2 performance statistics. The statistics gathered may further allow the device driver layer to determine if an end-device that the network interface is communicating to (such as a client if the device driver layer is in an access point or vice-versa) has sufficient bandwidth to support the particular network communication traffic. Thus, (particularly for bandwidth or latency sensitive applications) the end to end performance capabilities may also be considered when prioritizing particular communication traffic to a particular network interface.

The prioritization techniques described herein are advantageous that additional applications and/or network interfaces can be accommodated with minor system changes. For example, changes to the network interface standards are not generally required to implement the techniques described herein. Rather, adding applications and/or network interfaces or changing priority schemes may be dealt with at the device driver layer. Thus, in at least some circumstances updated firmware for the device driver layer may be the only modifications needed to existing systems to accommodate the prioritization techniques.

Returning to the exemplary information handling system 100 of FIG. 1, it is noted that the network interfaces 130-138 operate over a wide range of bands. For example, the exemplary bands include cellular bands, the 5 GHz band for 802.11a, the 2.4 GHz band for 802.11b/g, the 3.1 GHz to 10.6 GHz wide bands of UWB, etc. (it is noted that in this context the Ethernet network interface is contemplated to operate over a "band" even though it is a wired communication protocol as opposed to wireless). In some of the examples described above, different communication bands were selected for different types of traffic based upon the prioritization assignments. However, it is noted that as shown in FIG. 1 multiple network interfaces may be provided that operate in the same band, for example the 802.11a network interfaces 133 and 134 or the 802.11b/g network interfaces 135 and 136. It is contemplated that traffic prioritization may still be accomplished even within one band because certain network interfaces operate with multiple channels with a single band. For example, there may be 12 separate channels operating within the 802.11a band. Therefore, traffic having a certain priority may be assigned to a network interface operating at a specified channel and traffic having a different priority may be assigned to a network interface operating in the same band but on a different channel. Thus, multiple network interfaces within the same band may be utilized (for example as shown in FIG. 1 with the cellular, 802.11a and 802.11b/g bands) while allowing for prioritization between two network interfaces of the same band. Thus, the prioritization techniques described above may be applied to prioritization between bands, within bands, or both.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention. For example, the various communication protocols described herein (such as 802.11a/b/g/n, UWB, cellular, etc.) are merely exemplary and it will be recognized that other current and future standards may equally utilized the techniques described herein. Furthermore, the prioritization classes described herein are merely exemplary and other classes of traffic and/or other levels of priority may be utilized while still providing the benefits of the concepts disclosed herein.

What is claimed is:

1. A method for routing network communication traffic, comprising:
   providing an information handling system, the information handling system configured to process data from a plurality of types of user applications;
   providing a plurality of network interfaces; and
   selectively routing the network communication traffic between the plurality of network interfaces by prioritizing the network communication traffic based upon the type of user application that generates the network communication traffic, wherein the selective routing includes determinations based at least in part upon static characteristics of the plurality of network interfaces.

2. The method of claim 1, wherein the plurality of network interfaces comprises at least a plurality of wireless network interfaces.

3. The method of claim 2, wherein the types of network communication traffic generated by the user application include at least one type of network communication traffic that is bandwidth or latency sensitive.

4. The method of claim 3, wherein the type of network communication traffic generated by the user application comprises at least one of network management, voice or video traffic and at least one of the network management, voice, or video traffic receives a higher priority as compared to at least one other type of network traffic.

5. The method of claim 2, further comprising selectively designating two or more of the network interfaces to communicate certain priority levels of network communication traffic generated by the user application based upon the static characteristics of the two or more network interfaces.

6. The method of claim 5, wherein the characteristics utilized for the selective routing determinations also include dynamic characteristics.

7. The method of claim 6, wherein the dynamic characteristics include at least one end-to-end characteristic of networks that the two or more network interfaces are communicating with.

8. A method of routing wireless network traffic, comprising:
   providing a system that transmits or receives network traffic from a plurality of types of applications;
   providing a plurality of wireless network interfaces; and
   prioritizing the network traffic from different ones of the types of applications selectively between the plurality of wireless network interfaces based upon at least the type of the application.

9. The method of claim 8, wherein the prioritization is further based upon at least one characteristic of at least one network interface.

10. The method of claim 9, wherein at least two of the plurality of wireless network interfaces are formed by a multimode wireless device.

11. The method of claim 9, wherein network traffic of at least one bandwidth or latency sensitive type of application is prioritized higher than network traffic of at least one other type of application.

12. The method of claim 11, further comprising utilizing priority tags in network traffic packets to identify the priority levels of network traffic of different types of applications.

13. The method of claim 12, wherein the system is a client side system.

14. The method of claim 13, wherein the system is an enterprise system.

15. An information handling system configured to communicate network traffic, comprising:

one or more network traffic sources, wherein a plurality of application types of network traffic are provided by the one or more network traffic sources;

a plurality of network interfaces for communicating network traffic to a plurality of networks; and a device driver layer coupled to the network traffic sources to receive the plurality of application types of network traffic and coupled to the plurality of network interfaces, the device driver layer prioritizing network traffic based upon the application type of the network traffic selectively between different ones of the plurality of network interfaces.

16. The information handling system of claim 15, wherein the plurality of network interfaces includes a plurality of wireless network interfaces.

17. The information handling system of claim 16, wherein each of the network interfaces operates in a different band.

18. The information handling system of claim 15, wherein at least two of the network interfaces operate in the same band.

19. The information handling system of claim 15, wherein the prioritization is implemented at least in part with priority tags inserted in network traffic packets to identify the application type.

20. The information handling system of claim 19, wherein at least one multimode wireless device is utilized to form at least two of the network interfaces.

* * * * *